US007825548B2

(12) United States Patent
Maemura et al.

(10) Patent No.: US 7,825,548 B2
(45) Date of Patent: Nov. 2, 2010

(54) CYLINDRICAL LINEAR MOTOR

(75) Inventors: Akihiko Maemura, Kitakyushu (JP);
Yosuke Kawazoe, Kitakyushu (JP);
Takeo Suzuki, Kitakyushu (JP); Yuto Fukuma, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 75 days.

(21) Appl. No.: 12/090,949

(22) PCT Filed: Apr. 17, 2006

(86) PCT No.: PCT/JP2006/308057

§ 371 (c)(1),
(2), (4) Date: Apr. 21, 2008

(87) PCT Pub. No.: WO2007/046161

PCT Pub. Date: Apr. 26, 2007

(65) Prior Publication Data

US 2009/0033157 A1      Feb. 5, 2009

(30) Foreign Application Priority Data

Oct. 21, 2005  (JP)  ............................. 2005-307607
Jan. 20, 2006  (JP)  ............................. 2006-012409

(51) Int. Cl.
*H02K 41/02*       (2006.01)
(52) U.S. Cl. ............... 310/12.02; 310/12.33; 310/12.21; 310/12.27

(58) Field of Classification Search ................ 310/12, 310/12.24, 15, 23, 12.25, 12.31, 12.32, 12.26, 310/12.21, 12.02, 12.33, 12.27; *H02K 41/02*
See application file for complete search history.

(56) References Cited

U.S. PATENT DOCUMENTS 4,074,152 A  *  2/1978  Asai et al. .................... 310/334
4,365,179 A  *  12/1982 Mayo Magdaleno ......... 310/81

(Continued)

FOREIGN PATENT DOCUMENTS

CN        2573812 Y       9/2003

(Continued)

OTHER PUBLICATIONS

Chinese Office Action in counterpart Chinese Application No. 200680039341.3 dated Jan. 22, 2010.

*Primary Examiner*—Quyen Leung
*Assistant Examiner*—Terrance Kenerly
(74) *Attorney, Agent, or Firm*—Sughrue Mion, PLLC

(57) ABSTRACT

The cylindrical linear motor includes: a stator 1 that has a plurality of coils 5 coiled in a cylindrical shape and arranged in an axial direction on an inner side of a metal pipe 4; a mover 2 disposed to face an inner side of the stator 1 with a magnetic gap therebetween and having a plurality of permanent magnets 6 inserted in the axial direction into a cylindrical can 9; shafts 8 inserted into the mover 2; shaft support members 7 for supporting the shafts 8 at both axial ends of the metal pipe 4; and shaft receiving member 10 each disposed at both ends of an inner side of the can 9 to be adjacent to the permanent magnets 6 and having a concave portion 10*a* for fitting to a cone of the shaft 8.

13 Claims, 14 Drawing Sheets

U.S. PATENT DOCUMENTS

| | | | |
|---|---|---|---|
| 4,697,114 A * | 9/1987 | Amemiya et al. | 310/156.61 |
| 4,742,255 A * | 5/1988 | Nakagawa et al. | 310/12.17 |
| 5,323,073 A * | 6/1994 | Furutani | 310/12.11 |
| 5,434,549 A * | 7/1995 | Hirabayashi et al. | 335/229 |
| 6,186,756 B1 * | 2/2001 | Kojima et al. | 418/152 |
| 6,603,228 B1 * | 8/2003 | Sato | 310/83 |
| 7,042,118 B2 * | 5/2006 | McMullen et al. | 310/12.24 |
| 2004/0017122 A1 * | 1/2004 | Kozoriz | 310/90.5 |
| 2004/0104694 A1 * | 6/2004 | Nakamoto et al. | 318/135 |
| 2004/0130224 A1 * | 7/2004 | Mogi et al. | 310/75 R |
| 2004/0130229 A1 * | 7/2004 | Akatsu et al. | 310/112 |
| 2009/0289509 A1 * | 11/2009 | Hoshi et al. | 310/12.33 |

FOREIGN PATENT DOCUMENTS

| | | |
|---|---|---|
| CN | 1484357 A | 3/2004 |
| JP | 6-94751 A | 4/1994 |
| JP | 6-62787 U | 9/1994 |
| JP | 9-172767 A | 6/1997 |
| JP | 2000-4575 A | 1/2000 |

* cited by examiner

SECTION A-A'

SECTION B-B'

FIG. 8A
FIG. 8B
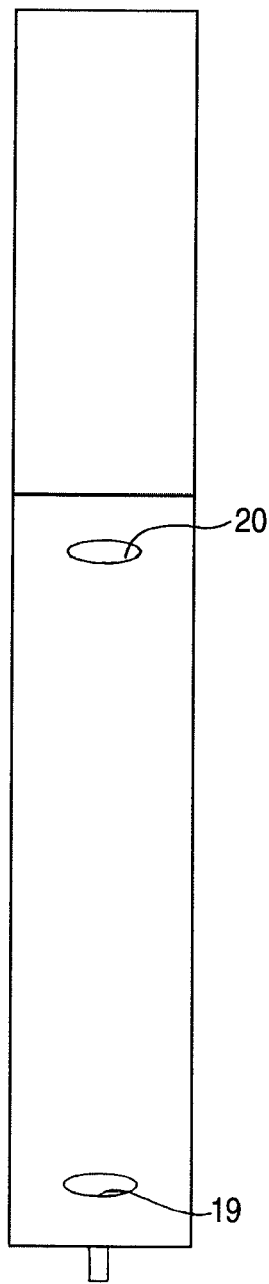
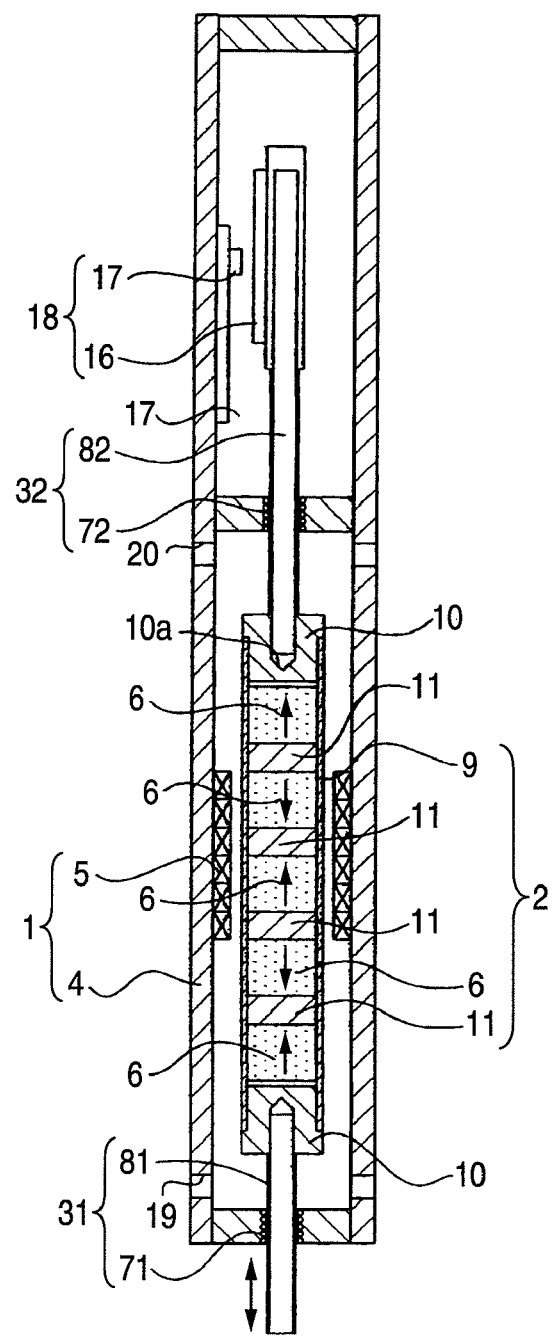

CYLINDRICAL LINEAR MOTOR

TECHNICAL FIELD

The present invention relates to a cylindrical linear motor having a movable magnet structure including a cylindrical field and an armature.

BACKGROUND ART

A general cylindrical linear motor having a cylindrical field and an armature is shown in FIG. 12.

FIG. 12 is a side sectional view illustrating a configuration of the known cylindrical linear motor.

In FIG. 12, Reference Numeral 1 denotes a stator, Reference Numeral 2 denotes a mover, Reference Numeral 3 denotes a support mechanism, Reference Numeral 5 denotes a coil, Reference Numeral 6 denotes a permanent magnet, Reference Numeral 7 denotes a shaft support member, Reference Numeral 8 denotes a shaft, Reference Numeral 9 denotes a can, and Reference Numeral 12 denotes a yoke.

The stator 1 is configured in which the plurality of cylindrical coils 5 serving as electrical loading means are arranged along an axial direction on an inside of the yoke 12 formed of a magnetic substance. The mover 2 is configured in which the plurality of permanent magnets 6 serving as magnetic loading means are inserted and arranged along the axial direction on an inside of the can 9 extending in the axial direction. The support mechanism 3 is configured in which the shaft 8 is inserted and fixed into the permanent magnet 6 of the mover 2 and then the shaft 8 is allowed to pass through the shaft support member 7 of the stator 1.

FIG. 13 is a side sectional view illustrating a fixing mechanism for fixing the cylindrical linear motor shown in FIG. 12 to an external device.

In FIG. 13, Reference Numeral 13 denotes a frame, and Reference Numeral 14 denotes a tap hole.

To attach the stator 1 to the external device, the frame 13 is fitted to an outer periphery of the yoke 12, an end of the frame 13 is provided with the tap hole 14 having a female screw, and a bolt screw (not shown) is fitted to the tap hole 14, thereby fixing the linear motor to the external device (not shown).

FIG. 14 is a side sectional view illustrating a configuration in which a linear encoder is additionally attached to the known cylindrical linear motor. The stator 1 and the mover 2 have the same configuration as the configuration shown in FIGS. 12 and 13.

In FIG. 14, Reference Numeral 16 denotes a linear scale, Reference Numeral 17 denotes a detector, Reference Numeral 18 denotes a linear encoder, Reference Numeral 31 denotes a shaft support mechanism, Reference Numerals 71 and 72 denote ball spline nuts, and Reference Numeral 81 denotes a spline shaft.

The shaft support mechanism 31 includes the spline shaft 81 coupled to the mover 2, and the ball spline nuts 71 and 72 serving as shaft support members for supporting the shaft 8 in both ends of a metal pipe 4 of the stator 1 in the axial direction, thereby enabling to move the mover 2 in the axial direction.

The optical linear scale 16 of the linear encoder 18 is disposed at one end of the spline shaft 81 to which the mover 2 is attached, and the detector 17 for detecting the linear scale 16 is disposed on the stator 1 to face the linear scale 16. With such a configuration, a position of the mover 2 relative to the stator 1 in a sliding direction is detected by the encoder 18.

With such a configuration, when a current is allowed to flow from an external power supply (not shown) to the electrical loading means of the stator, a thrust force in the axial direction is generated between the electrical loading means of the mover and the magnetic loading means of the stator, the mover is supported to be movable in the axial direction through a gap of the stator by the support mechanism, and the thrust force is taken out by the shaft of the mover (e.g., see Patent Documents 1 and 2).

Patent Document 1: Japanese Unexamined Utility Model Registration Application Publication No. 6-62787 (see Page 2 of Specification, and FIGS. 1 to 4)

Patent Document 2: Japanese Unexamined Patent Application Publication No. 2000-4575 (see Page 9 of Specification, and FIGS. 5A to 5C)

DISCLOSURE OF THE INVENTION

Problem that the Invention is to Solve

However, the known cylindrical linear motor has the following problems (1) to (3).

(1) The mover and the shaft serving as the support mechanism are coupled by inserting the shaft into the cylindrical permanent magnet of the mover. For this reason, when the outer diameter of the mover is sufficiently larger than the outer diameter of the shaft as shown in FIG. 12, it is possible to secure a space for disposing the permanent magnet serving as the magnetic loading means in the can. However, when the outer diameter of the mover is as small as the outer diameter of the shaft, it is difficult to secure the space for disposing the permanent magnet.

To solve this problem, the shaft may be inserted and installed in both ends of the can shown in FIG. 12 to fix the mover and shaft. However, in this configuration, a shaft having an outer diameter suitable for the inner diameter of the can is necessary and thus it is difficult to use widely-available standardized parts, thereby causing high cost.

When the diameter of the mover is so small that the diameter of the shaft becomes a problem, it is general that the can is very thin and is made of nonmagnetic stainless from the viewpoint to make loss of magnetic flux generated by the permanent magnet as small as possible. For this reason, the can and the shaft are coupled generally by adhesion, because the can is thin to have no sufficient strength in pressing or shrink-fitting and the binding strength is short. However, in the binding of adhesion, variations of the binding strength are large, and thus there is a problem of insufficient reliability of a product.

Thus, a method of inserting the shaft into the can and welding the shaft is conceivable. However, it is technically difficult to weld different kinds of metals to each other at the time of welding, and it is difficult to secure a sufficient binding strength by welding. For this reason, it is necessary to make the shaft of the same nonmagnetic stainless as the can. Since most of the widely available standardized parts are generally made of steels, parts made of stainless are specially ordered parts, thereby causing further higher cost.

(2) In the known cylindrical linear motor, generally a metal pipe such as steel having a magnetic characteristic is used in a yoke of the stator. The steel pipe may be used as a structural material, and it is possible to attach the steel pipe to a device by providing the steel pipe with a tap.

However, in the small-size cylindrical linear motor (e.g., an outer diameter of a stator is 10 mm), when a thickness of a metal pipe of a yoke is about 0.5 mm, the thickness is sufficient as a structural material for passing through magnetic flux generated by a permanent magnet. However, in this thickness, it is difficult to provide a tap (e.g., when a bolt screw of M2 is used, a tap depth needs to be twice as much as the diameter of the screw).

For this reason, in the known cylindrical linear motor, and particularly, the small-size motor (FIG. 13), a frame is provided outside the yoke and the frame is provided with a tap hole, thereby attaching to a fixed surface.

The main purpose of the frame is to provide a tap for attaching to the fixed surface of the external device. Also, in the small-size linear motor, if the metal pipe of the yoke is provided with a mechanism for directly attaching to a fixed surface by any means, cost is down.

As described above, in the known cylindrical linear motor, and particularly the small-size motor, the frame is provided with the tap hole, and the motor is attached to the fixed surface by using the frame. Accordingly, the cost of cylindrical linear motor increases due to cost of the frame.

(3) In the known cylindrical linear motor as shown in FIG. 14, when the mover 2 moves within a stroke at positions of the shaft support members 71 and 72 for supporting both ends of the spline shaft 81, air flows from a space S1 to a space S3 via a space S2 as a gap.

In the small-size cylindrical linear motor (e.g., an outer diameter of a stator is 10 mm), the volume of the space S2 is very small. Accordingly, the air flowing from the space S1 to the space S3 is very little.

FIGS. 15A and 15B are schematic views illustrating flow of air at the time when the linear motor shown in FIG. 14 moves within the stroke. FIG. 15A illustrates that the mover is located at the left end and FIG. 15B illustrates that the mover is located at the right end.

As shown in FIG. 15A, when the mover moves to the left end of the movement stroke, the space S1 is pressurized and the space S3 is depressurized. Grease fed to the shaft support member 7 is allowed to flow out of the motor by the air pressurized in space S1, and grease fed to the shaft support member 7 is allowed to flow into the space S3 by the air depressurized in the space S3.

As shown in FIG. 15B, when the mover moves to the right end of the movement stroke, the space S1 is depressurized and the space S3 is pressurized. The grease fed to the shaft support member 7 is allowed to flow into the space S1 by the air depressurized in the space S1, and the grease fed to the shaft support member 7 is allowed to flow into the space S4 by the air pressurized in the space S3.

As described above, in order to move the mover, it is necessary to pressurize or depressurize the air in the motor. According to the variation in air pressure in the motor, a thrust force necessary for movement increases, the greases fed to the shaft support member flows out, and the life of the support mechanism is shortened. In addition, when the grease flows into the space S4, a linear scale or a detector is stained, thereby deteriorating reliability of a linear encoder.

The invention has been made to solve the above problems. The first object of the invention is to provide a cylindrical linear motor in which a support mechanism of a mover with low cost and high reliability can be provided and a space for disposing a permanent magnet can be secured in the mover, even when it is difficult to make an outer diameter of the mover larger than that of the shaft. The second object of the invention is to provide a cylindrical linear motor having a frameless structure by providing a yoke constituting a stator with an attachment mechanism to a fixed surface. The third object of the invention is to provide a cylindrical linear motor having high durability and including a detecting device having high reliability, by solving leakage of grease fed to a shaft support mechanism.

Means for Solving the Problem

To solve the aforementioned problems, the invention has the following configuration.

According to a first aspect of the invention, a cylindrical linear motor comprises:

a stator that has a plurality of coils coiled in a cylindrical shape and serving as electrical loading means, the plurality of coils being arranged in an axial direction on an inner side of a metal pipe made of a cylindrical magnetic material;

a mover disposed to face an inner side of the stator with a magnetic gap therebetween and having a plurality of permanent magnets serving as magnetic loading means, the plurality of permanent magnets being inserted in the axial direction into a cylindrical thin can made of stainless extending in the axial direction;

support mechanisms that include shafts inserted into the mover, and shaft support members for supporting the shafts such that the mover is movable in the axial direction at both axial ends of the metal pipe of the stator; and shaft receiving member each disposed at both ends of an inner side of the can to be adjacent to the permanent magnets, the shaft receiving member having a concave portion for fitting to a cone of the shaft.

According to a second aspect of the invention, as set forth in the first aspect, the shaft receiving member are made of a stainless material, and the shaft receiving member are inserted into the can and then are fixed by welding.

According to a third aspect of the invention, as set forth in the second aspect, the welding is performed by Tig welding.

According to a fourth aspect of the invention, as set forth in the second aspect, the welding is performed by laser welding.

According to a fifth aspect of the invention, as set forth in the second aspect, the welding is performed by electron beam welding.

According to a sixth aspect of the invention, as set forth in the first aspect, at least one of the support mechanisms provided at both axial ends uses a ball spline nut as the shaft support member, and uses a spline shaft as the shaft.

According to a seventh aspect of the invention, as set forth in the first aspect, the metal pipe includes:

a convex portion provided on a part of a circumference of the metal pipe along the axial direction and molded to house a crossover wires of the coils; and through-holes formed at axial ends of the convex portion to attach the metal pipe to an external device by bolt screws.

According to an eighth aspect of the invention, as set forth in the seventh aspect, the convex portion of the metal pipe has a substantially U-shaped cross section as viewed in the axial direction, wherein a male screw and a bolt head of the bolt screw are formed of cylindrical members and disposed perpendicular to each other, and wherein the bolt head is disposed along the axial direction in the convex portion.

According to a ninth aspect of the invention, as set forth in the seventh or eighth aspect, the bolt screw is made of a nonmagnetic material.

According to a tenth aspect of the invention, as set forth in the seventh aspect, the through-holes have a slotted hole shape extending in the axial direction.

According to an eleventh aspect of the invention, as set forth in the seventh or tenth aspect, the through-holes are a cutout hole formed by cutting out an end of the metal pipe.

According to a twelfth aspect of the invention, as set forth in the first aspect, an air hole penetrating in a diameter direction is formed in at least one side of the metal pipe close to the shaft support member to keep air pressure constant in the linear motor.

According to a thirteenth aspect of the invention, as set forth in the first or twelfth aspect, when the mover of the cylindrical linear motor is vertically movable, a grease pool concentric with the shaft is provided on a vertical upper surface of the ball spline nut of the shaft support member.

ADVANTAGE OF THE INVENTION

According to the first aspect of the invention, the shaft receiving member are provided to be inscribed inside the can and to be circumscribed outside the shafts between the can and the shaft, and the shafts are fitted and fixed to the concave portions of the shaft receiving member. Accordingly, even when it is difficult to make the outer diameter of the mover larger than the outer diameter of the shaft, it is possible to secure the space for disposing the permanent magnet in the mover and to use products available on the market irrespective of size of the inner diameter of the can, thereby reducing cost.

According to the second aspect of the invention, since the shaft receiving member is made of the same material as that of the can, it is possible to couple the shaft receiving member and the thin stainless can to each other by welding, thereby improving reliability.

According to the third aspect of the invention, since the shaft receiving member and the can are welded by the Tig welding coming into the widest use, it is possible to produce the cylindrical linear motor without introducing new welding equipment.

According to the fourth aspect of the invention, since the shaft receiving member and can are welded by the laser welding with high energy density, only the welded portion becomes a high temperature and heat is not applied to the other portions. Therefore, it is possible to suppress thermal deformation at the time of welding and to couple the can and the shaft receiving member with high precision.

According to the fifth aspect of the invention, since the shaft receiving member and the can are welded by the electron beam welding with the highest energy density, only the welded portion becomes a high temperature and heat is not applied to the other portions. Therefore, it is possible to suppress thermal deformation and to couple the can and the shaft receiving member with high precision, and further, it is possible to increase the melting penetration quantity of the melting and to raise the coupling strength.

According to the sixth aspect of the invention, since the shafts provided at both axial ends are coupled individually to the mover, only one of the supports mechanisms can be formed of a ball spline nut and a spline shaft having a rotation preventing mechanism for the shaft. When the ball spline support of one shaft can be inexpensively configured as compared with a case where both shafts are formed in a ball spline manner.

According to the seventh aspect of the invention, a convex portion is used which passes the crossover wires for the coils of the metal pipe made of a cylindrical magnetic material, and thus a bolt screw for attaching it to the fixed surface may be provided. For this reason, a frame is not necessary and it is possible to reduce cost.

According to the eighth aspect of the invention, the convex portion formed in the metal pipe has the substantially U-shaped cross section, the bolt head of the bolt screw is formed of a cylindrical member along the axial direction in the circular inside of the convex portion. Therefore, when the metal pipe is attached to the fixed surface of the external device by the bolt screw, it is unnecessary to grip the bolt head, thereby easily attaching it.

According to the ninth aspect of the invention, since the bolt screw is made of the nonmagnetic material, it is possible to remove cogging caused by variation in permeance in the axial direction that is the moving direction of the mover, thereby suppressing ripple of the thrust force in the course of moving.

According to the tenth aspect of the invention, when the bolt screw is put into the through-hole formed in the convex portion of the metal pipe, the bolt screw comes out from the inside of the metal pipe through the through-hole to the outside. Therefore, when the through-hole has the slotted hole shape extending in the axial direction, it is easy to put the bolt screw and it is possible to reduce the working time.

According to the eleventh aspect of the invention, it is possible to put the bolt screw from the end of the metal pipe along the cutout hole and to easily attach the bolt screw, thereby further reducing the working time.

According to the twelfth aspect of the invention, since the air in the linear motor flows in and out through the air holes, it is possible to keep the air pressure in the motor constant, thereby reducing the thrust force necessary for movement. In addition, since there is no case that the grease fed to the ball spline nut constituting the support mechanism flows out due to variation in pressure in the motor, it is possible to improve durability of the support mechanism. Further, when a position detector for detecting the position of the mover is provided close to the support mechanism of the motor, there is no case that the position detector is stained with the grease, thereby improving reliability of the detecting device.

According to the thirteenth aspect of the invention, when the mover of the cylindrical linear motor is vertically movable, the grease is pooled in the grease pool formed on the vertical upper surface of the nut constituting the support mechanism. Therefore, it is unnecessary to supply grease.

BRIEF DESCRIPTION OF THE DRAWINGS

FIG. 5A is a front sectional view as taken along Line A-A' shown in FIG. 4, FIG. 5B is a front sectional view as taken along Line B-B' shown in FIG. 4, and FIG. 5C is a perspective view illustrating a bolt screw fastened to the stator;

FIGS. 8A and 8B are views illustrating a configuration that a linear encoder is attached to a cylindrical linear motor according to a seventh embodiment of the invention, where FIG. 8A is a plan view and FIG. 8B is a side sectional view;

FIG. 9A is a view illustrating that the mover is located at the left end and FIG. 9B is a view illustrating that the mover is located at the right end;

FIG. 15A is a view illustrating that the mover is located at the left end and FIG. 15B is a view illustrating that the mover is located at the right end.

DESCRIPTION OF REFERENCE NUMERALS AND SIGNS

1: STATOR
2: MOVER
3, 31: SUPPORT MECHANISM
4: METAL PIPE
4a: CONVEX PORTION
4b: THROUGH-HOLE
4c: CUTOUT HOLE
5: COIL
5a: CROSSOVER WIRES
6: PERMANENT MAGNET
7: SHAFT SUPPORT MEMBER
8: SHAFT
71: BALL SPLINE NUT
81: SPLINE SHAFT
9: CAN
10: SHAFT RECEIVING MEMBER
10a: CONCAVE PORTION
11: STEEL PIECE
12: YOKE
13: FRAME
14: TAP HOLE
15: BOLT SCREW
15a: BOLT HEAD
15b: MALE SCREW
16: LINEAR SCALE
17: DETECTOR
18: LINEAR ENCODER
19, 20: AIR HOLE
21: GREASE POOL
S1 to S4: SPACE

BEST MODE FOR CARRYING OUT THE INVENTION

Hereinafter, embodiments of the invention will be described with reference to the drawings.

FIRST EMBODIMENT

Figure 1:
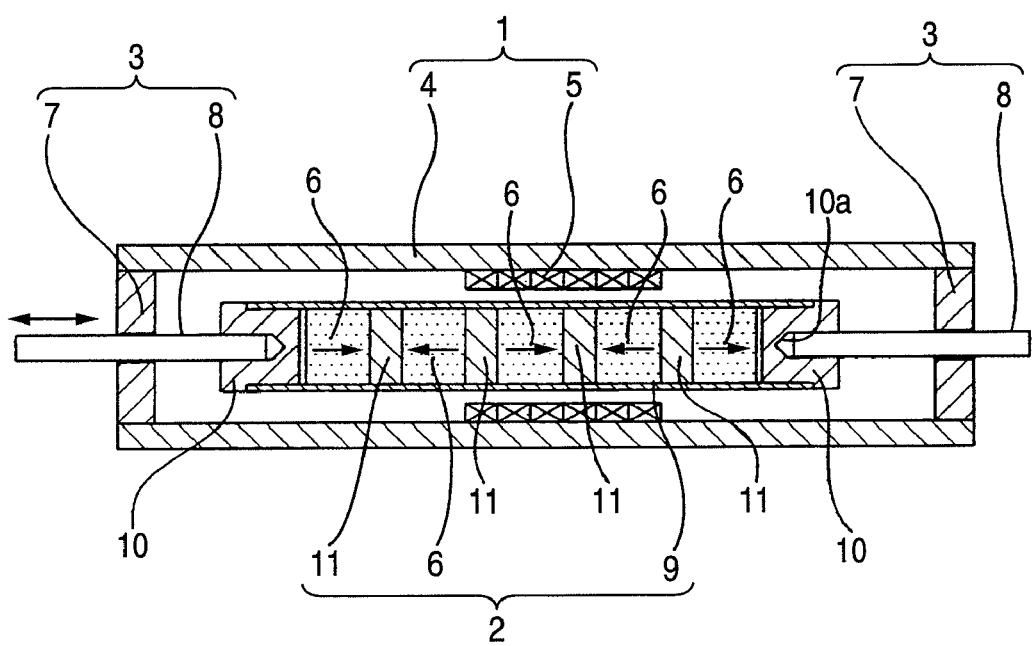
FIG. 1 is a side sectional view illustrating a cylindrical linear motor according to a first embodiment of the invention.

FIG. 1 is a side sectional view illustrating a cylindrical linear motor according to a first embodiment of the invention. The description of the same constituent elements of the invention as the known art is omitted, but differences thereof will be described.

In FIG. 1, Reference Numeral 4 denotes a metal pipe, Reference Numeral 10 denotes a shaft receiving member, Reference Numeral 10a denotes a concave portion 11, and Reference Numeral 11 denotes a steel pieces.

The invention is characterized as follows.

The stator 1 has a plurality of coils 5 coiled in a cylindrical shape and serving as electrical loading means and a plurality of coils 5 are arranged in an axial direction in a metal pipe 4 as a yoke made of a cylindrical magnetic material.

The mover 2 is disposed to face the inside of the stator 1 with a magnetic gap therebetween, and a plurality of permanent magnets on the circumference, serving as magnetic loading means, (magnetized in directions represented by arrows) are inserted in the axial direction into a cylindrical thin stainless can 9 extending in the axial direction having same polarity with steel pieces 11 on the circumference interposed therebetween, which are coupled to each other by adhesion. The steel pieces 11 are provided between the permanent magnets 6 inserted in the axial direction having the same polarity, the purpose of which is to strongly fix the permanent magnets 6 in the thin stainless can 9 by using absorption force acting between the permanent magnets 6 and the steel pieces 11.

The support mechanism 3 includes shafts 8 inserted into the mover 2 and shaft support members 7 for supporting the shafts 8 so as to move the mover 2 in the axial direction at both axial ends of the metal pipe 4 of the stator 1.

At both ends of inner side of the can 9, shaft receiving member 10 are disposed adjacent to the permanent magnets 6. Each of the shaft receiving member 10 is provided with a concave portion 10a smaller than the outer diameter of the shaft 8 as much as a tightening clearance, so that a cone (an inclined sharpened portion of a front end) of the shaft 8 is pressed and fitted thereto. The shaft receiving member 10, to which the shafts 8 are attached, and the mover 2 are coupled to each other by inserting the shaft receiving member 10 into both ends of the can 9 of the mover 2.

In the first embodiment of the invention, the shaft receiving member 10 are provided to be inscribed inside the can 9 and to be circumscribed outside the shafts 8 between the mover 2 and the shaft 8. Accordingly, even when the outer diameter of the mover is almost equal to the outer diameter of the shaft, it is possible to inexpensively make shafts to support the mover.

In the present embodiment as describe above, the shafts 8 constituting the support mechanism 3 are attached to the mover 2, current is allowed to flow in the coil 5 of the stator 1 to generate a thrust force in magnetic flux generated by the permanent magnets 6 of the mover 2, and the force can be drawn out through the shafts 8.

SECOND EMBODIMENT

Figure 2:
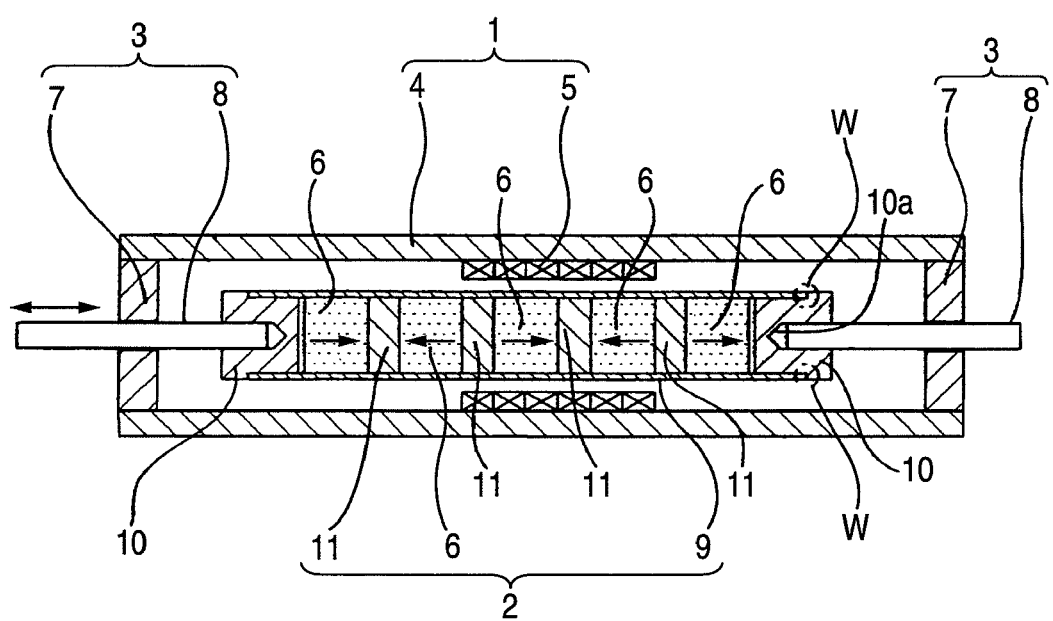
FIG. 2 is a side sectional view illustrating a cylindrical linear motor according to a second embodiment of the invention.

FIG. 2 is a side sectional view illustrating a cylindrical linear motor according to a second embodiment of the invention.

The configuration of the stator 1 is the same as the first embodiment, and thus the description thereof is omitted.

In the second embodiment, differences from the first embodiment are as follows.

The coupling of the shaft 8 and the shaft receiving member 10 is the same in that the shaft receiving member 10 is provided with a concave portion 10*a* smaller than the outer diameter of the shaft 8 as much as a tightening clearance so that the cone of the shaft 8 is fitted and pressed into the concave portion 10*a*. However, the shaft receiving member 10, to which the shafts 8 are attached, and the can 9 are coupled to each other by inserting and adhering the shaft receiving member 10 into both ends an inner side of the can 9 and then welding the connection portion W between the can 9 and the shaft receiving member 10 with laser.

In the second embodiment of the invention, the shaft receiving member 10 is made of the stainless material as the material of the can 9. Accordingly, it is possible to couple the shaft receiving member with a thin stainless can by welding, thereby improving reliability in coupling.

In the present embodiment, since the shaft receiving member and the thin stainless can are coupled by laser welding, only the welded portion becomes a high temperature and heat is not applied to the other portions. Accordingly, it is possible to suppress thermal deformation at the time of welding. Therefore, the can and the shaft receiving member can be coupled to each other with high precision.

It has been confirmed that a shaft receiving member and a thin stainless can may be coupled by Tig welding or electron beam welding. The Tig welding has an advantage in that it is unnecessary to introduce new equipment since the Tig welding is a welding method coming into the widest use. The electron beam welding can improve reliability since thermal deformation is suppressed at the time of welding and the melting penetration quantity is large to raise the coupling force. In an experiment, when a coupling force of the laser welding was 1, in the Tig welding, a coupling force was 0.6 since a welding area was reduced due to thermal deformation. In the electron beam welding, a coupling force was 1.3 since the melding penetration quantity was large.

In the present embodiment as described above, the shafts 8 constituting the support mechanism 3 are attached to the mover 2, current is allowed to flow in the coil 5 of the stator 1 to generate a thrust force in magnetic flux generated by the permanent magnets 6 of the mover 2, and the force can be drawn out through the shafts 8.

THIRD EMBODIMENT

Figure 3:
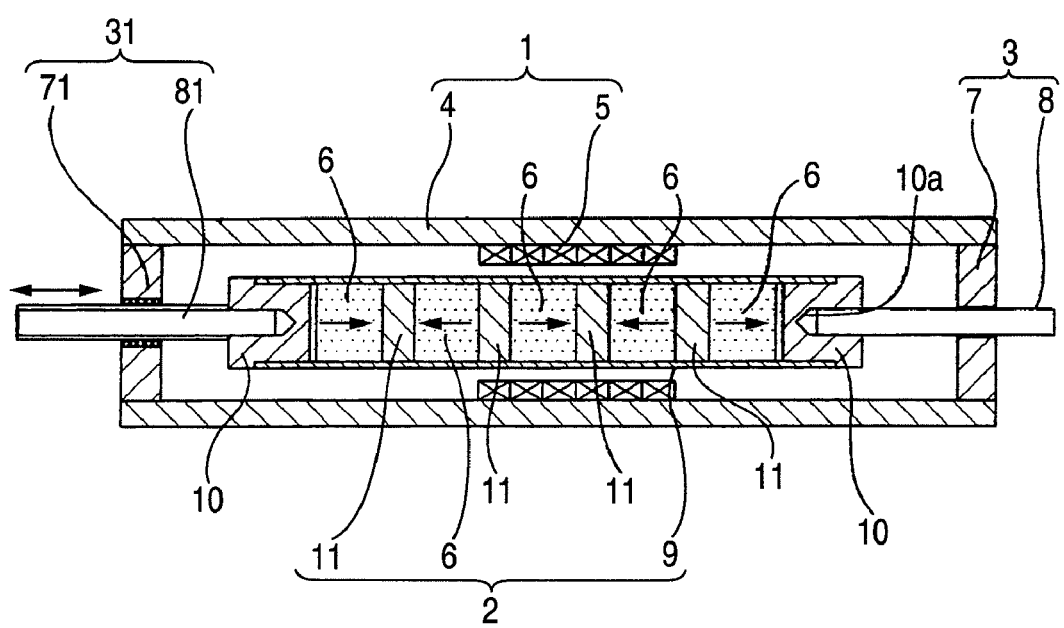
FIG. 3 is a side sectional view illustrating a cylindrical linear motor according to a third embodiment of the invention.

FIG. 3 is a side sectional view illustrating a cylindrical linear motor according to a third embodiment of the invention.

In FIG. 3, Reference Numeral 31 denotes a support mechanism, Reference Numeral 71 denotes a ball spline nut, and Reference Numeral 81 denotes a spline shaft.

The configuration of the stator 1 is the same as the first and second embodiments, and thus the description thereof is omitted.

In the third embodiment, differences from the first embodiment are as follows.

At least one side of the support mechanism provided at both axial ends is formed of a ball spline mechanism using a ball spline nut 71 as the shaft support member and using a spline shaft 81 as the shaft.

The purpose thereof is to prevent the shaft from rotating since at least one shaft is formed of a spline shaft, making use of the advantage of the invention, which is capable of attaching individual shafts 8 and 81 to the mover 2.

In the third embodiment of the invention with such a configuration, it is possible to configure a support mechanism for preventing the shaft from rotating without using expensive spiral shafts as both shafts.

FOURTH EMBODIMENT

Figure 4:
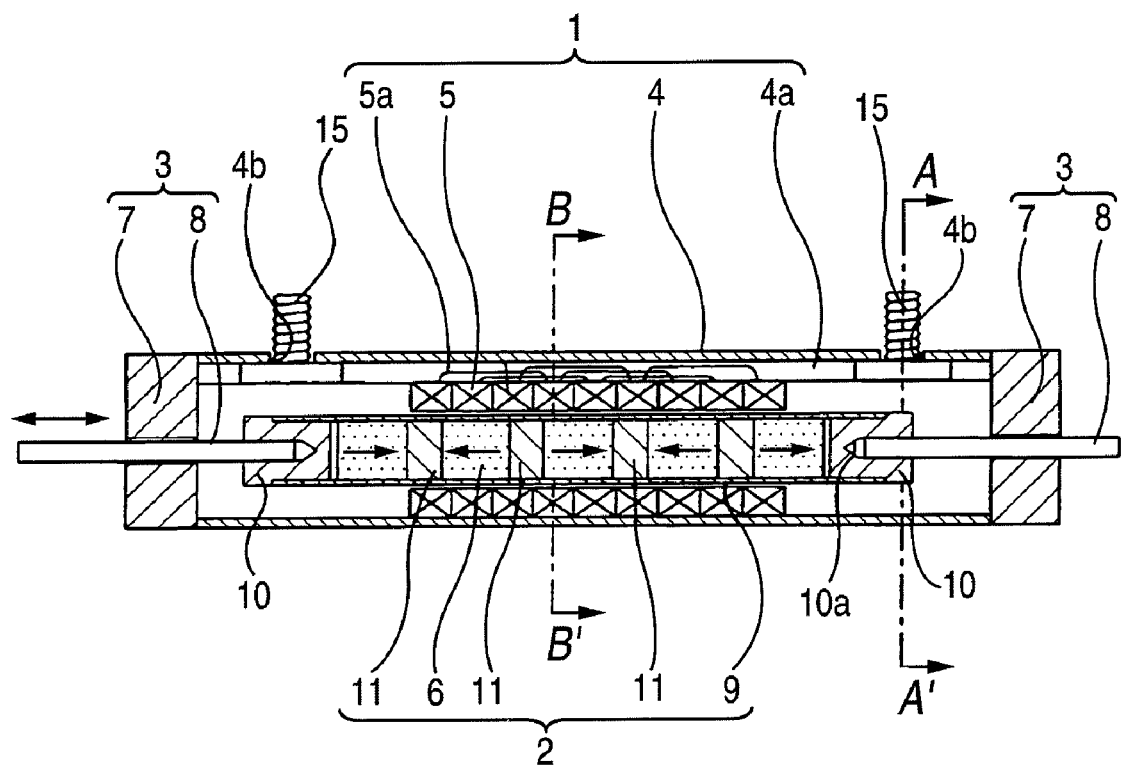
FIG. 4 is a side sectional view illustrating a cylindrical linear motor according to a fourth embodiment of the invention.
Figure 5A:
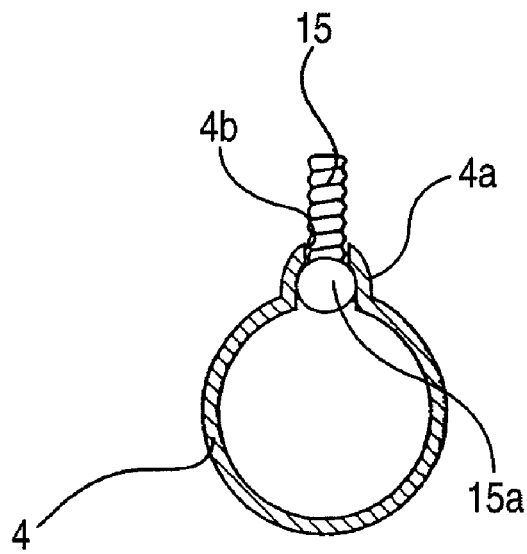
FIGS. 5A to 5C are views illustrating a stator of the cylindrical linear motor shown in FIG. 4, where
Figure 5B:
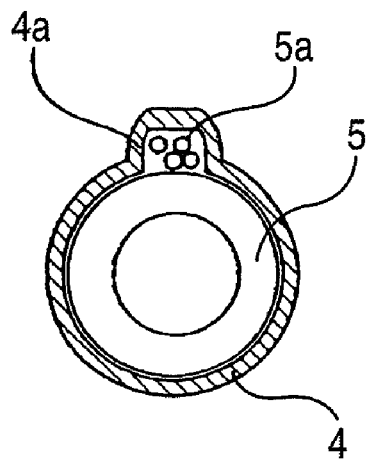
Figure 5C:
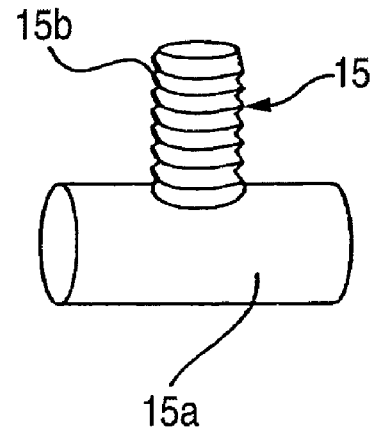

FIG. 4 is a side sectional view illustrating a cylindrical linear motor according to a fourth embodiment of the invention, and FIGS. 5A to 5C are views illustrating a stator of the cylindrical linear motor, where FIG. 5A is a front sectional view as taken along Ling A-A' shown in FIG. 4, FIG. 5B is a front sectional view as taken along Line B-B' shown in FIG. 4, and FIG. 5C is a perspective view illustrating a bolt screw to be mounted on the stator.

The description of the same constituent elements of the invention as the first to third embodiments is omitted, but differences thereof will be described.

In FIG. 4, Reference Numeral 4*a* denotes a convex portion, Reference Numeral 4*b* denotes a through-hole, Reference Numeral 5*a* denotes a crossover wires, Reference Numeral 15 denotes a bolt screw, and Reference Numeral 15*a* denotes a bolt head.

In the fourth embodiment, differences from the first and third embodiments are as follows.

The metal pipe 4 has a convex portion 4*a* provided on a part of a circumference of the metal pipe 4 along the axial direction and molded to house a crossover wires 5*a* of the coil 5, and has circular through-holes 4*b* formed at axial ends of the convex portion 4*a* to attach the metal pipe 4 to an external device (not shown) by bolt screws 15. The convex portion 4*a* formed on the metal pipe 4 constituting the stator 1 has a substantially U-shaped cross section along the axial direction, as shown in the section A-A' of FIG. 5A.

As shown in FIG. 5C, a male screw 15*b* and a bolt head 15*a* of the bolt screw 15 are formed of cylindrical members disposed perpendicular to each other. The bolt head 15*a* is attached along the axial direction in the convex portion 4*a*, and is configured to prevent the bolt screw 15 from rotating at the time of attaching to a fixing surface of an external device (not shown).

In the present embodiment, the bolt screw 15 is made of nonmagnetic stainless and brass. In an operation test, it was confirmed that there is no cogging caused by variation in permeance in the axial direction that is a moving direction of the mover, in case of the bolt screw 15 made of stainless and brass.

Next, assembling of the stator will be described.

The stator 1 is formed by expanding the metal pipe 4 made of cylindrical magnetic substance by hydroforming, in which a part of the metal pipe 4 is molded into the convex portion 4*a* protruding along the axial direction. A plurality of coils 5 wound in a cylindrical shape are arranged and mounted on a center inside the metal pipe 4, and the crossover wires 5*a* is housed on a surface of the convex portion 4*a* opposed to the coils 5. When the stator 1 is attached to an external device (not shown), the bolt screws 15 are inserted from the inside of the metal pipe 4 into the through-holes 4b provided close to both axial ends of the convex portion 4a and the bolt screws 15 are fitted to the fixing surface of the external device (now shown), thereby fixing the stator 1 to the external device.

In the fourth embodiment of the invention, a part of the metal pipe 4 constituting the stator 1 is formed into the convex portion 4a along the axial direction, and the stator 1 can be easily attached to the fixing surface of the external device by the bolt screws 15. Therefore, it is possible to configure a frameless structure with low cost.

EMBODIMENT 5

Figure 6:
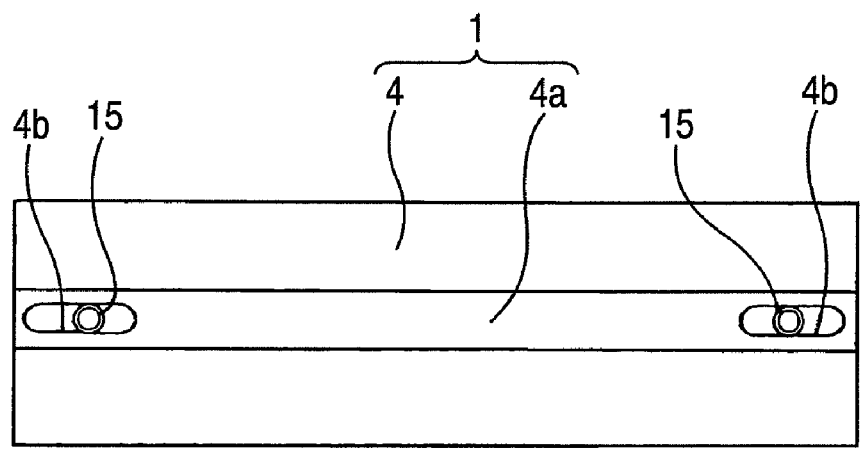
FIG. 6 is a side view illustrating a stator of a cylindrical linear motor according to a fifth embodiment of the invention as viewed from a convex portion side.

FIG. 6 is a side view illustrating a stator of a cylindrical linear motor as viewed from a convex portion side according to a fifth embodiment of the invention. The basic configuration of the stator 1 is the same as the fourth embodiment and thus the description thereof is omitted, but differences will be described.

In the fifth embodiment, differences from the fourth embodiment are as follows.

The through-holes 4b formed on the convex portion 4a of the metal pipe 4 constituting the stator 1 have a slotted hole shape extending in the axial direction.

In the present embodiment, a small linear motor including the metal pipe 4 having an outer diameter of about 10 mm is provided. When the bolt screws are inserted into the through-holes 4b, it is necessary to allow the bolt screw 15 to pass from the inside to the outside of the metal pipe 4 while gripping the bolt head of the bolt screw 15 using tweezers or the like. In case of performing this work, a worker allows the bolt screw 15 to pass through the through-hole 4b while looking from the section of the metal pipe 4 into the inner surface of the metal pipe 4, as shown in FIG. 6. For this reason, it is easy to distinguish that the bolt screw 15 tumbles at a right angle to the axial direction of the metal pipe 4, but it is difficult to distinguish that the bolt screw 15 tumbles in the axial direction of the metal pipe 4. The through-hole 4b generally has a slightly larger size than that of the bolt screw 15. In a case where the through-hole 4b has a circular shape, when the bolt screw 15 tumbles in the axial direction, it is difficult to allow the bolt screw 15 to pass, thereby deteriorating workability.

In the fifth embodiment, the through-hole 4b is formed in a slotted hole shape extending in the axial direction. Thus, even when the bolt screw 15 tumbles in the axial direction of the metal pipe 4 at the time of the work, the bolt screw 15 can be easily allowed to pass through the through-hole 4b. Accordingly, it is possible to remarkably improve workability at the time of attaching the metal pipe 4 to the external device by allowing the bolt screw 14 to pass through the through-hole 4b. It was confirmed that the present embodiment can reduce a working time by about 20% as compared with that of the fourth embodiment.

SIXTH EMBODIMENT

Figure 7:
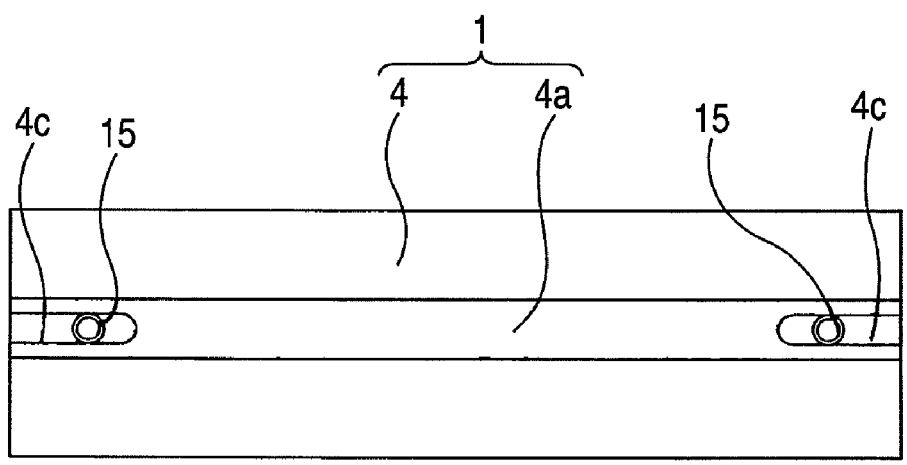
FIG. 7 is a side view illustrating a stator of a cylindrical linear motor according to a sixth embodiment of the invention as viewed from a convex portion side.

FIG. 7 is a side view illustrating a stator of a cylindrical linear motor according to a sixth embodiment of the invention.

In FIG. 7, Reference Numeral 4c denotes a cutout hole.

In the sixth embodiment, a difference from the fifth embodiment is as follow.

That is, cutout holes 4c formed by cutting out ends of the metal pipe 4 are provided instead of the through-holes used in the fifth and sixth embodiments.

In the present embodiment, cutout holes 4c are formed at both ends of the metal pipe 4 constituting the stator 1. In this case, the bolt screws 15 can be very easily put into the cutout holes 4c, and further the bolt screws 15 can be smoothly attached to an external device. It was confirmed that a working time can be reduced by about 60% as compared with that of the fourth embodiment.

SEVENTH EMBODIMENT

Figure 9A:
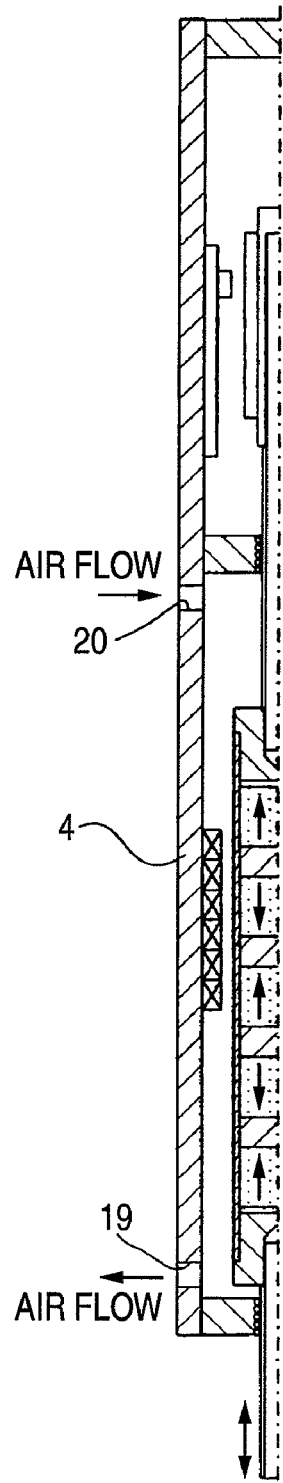
FIGS. 9A and 9B are schematic views illustrating flow of air at the time when the cylindrical linear motor shown in FIGS. 8A and 8B moves within a stroke, where
Figure 9B:
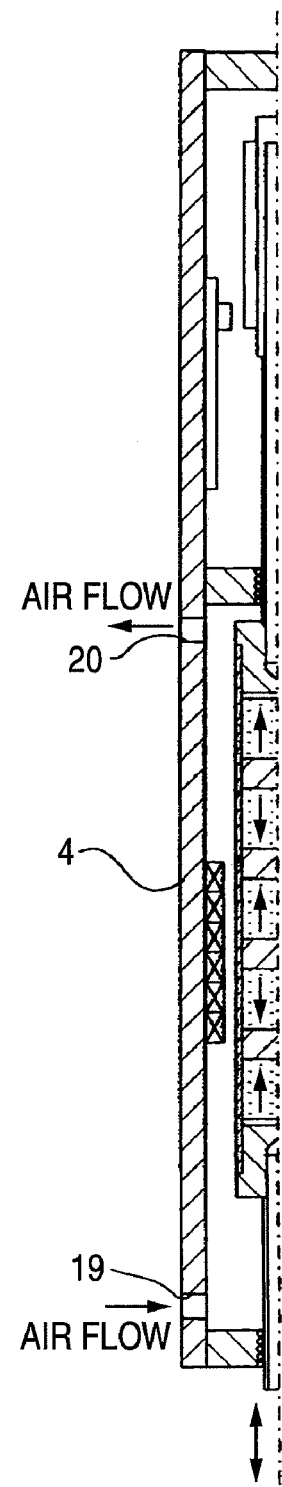
Figure 10:
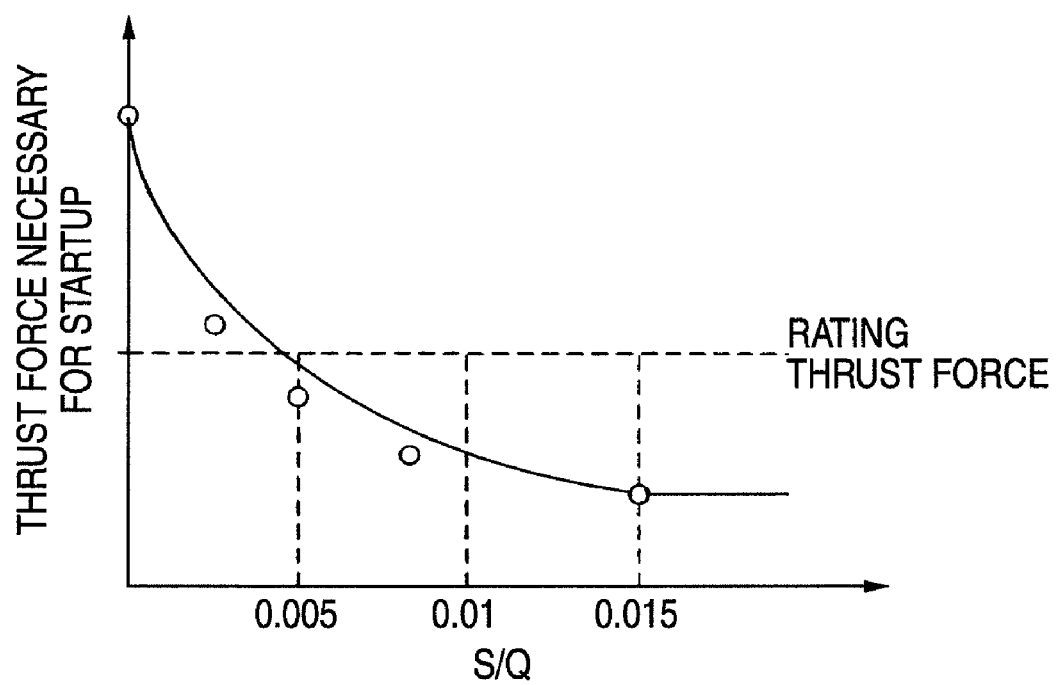
FIG. 10 is a graph illustrating relationship between an area of an air hole and a thrust force required on startup.

FIGS. 8A and 8B are views illustrating a configuration that a linear encoder is attached to a cylindrical linear motor according to a seventh embodiment of the invention, where FIG. 8A is a plan view and FIG. 8B is a side sectional view. FIGS. 9A and 9B are schematic views illustrating flow of air at the time when the cylindrical linear motor shown in FIGS. 8A and 8B moves within a stroke, where FIG. 9A illustrates that the mover is located at the left end and FIG. 9B illustrates that the mover is located at the right end. FIG. 10 is a graph illustrating relation between an area of an air hole and a thrust force necessary for movement, where a horizontal axis indicates a ratio of a cross section S [mm$^2$] to a volume Q [mm$^3$] of air in a motor, and a vertical axis indicates a force necessary for movement.

Figure 14:
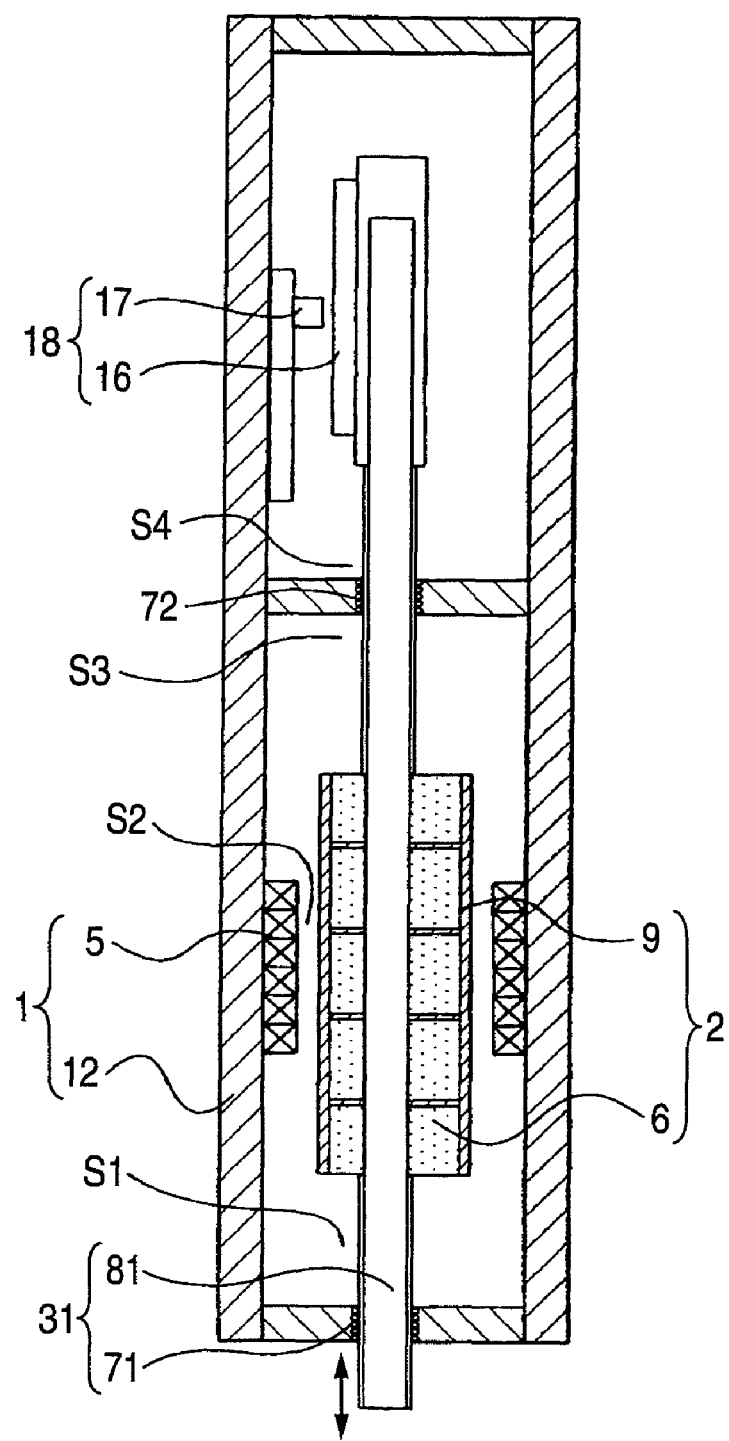
FIG. 14 is a side sectional view illustrating a configuration that an encoder is attached to a known cylindrical linear motor.
Figure 15A:
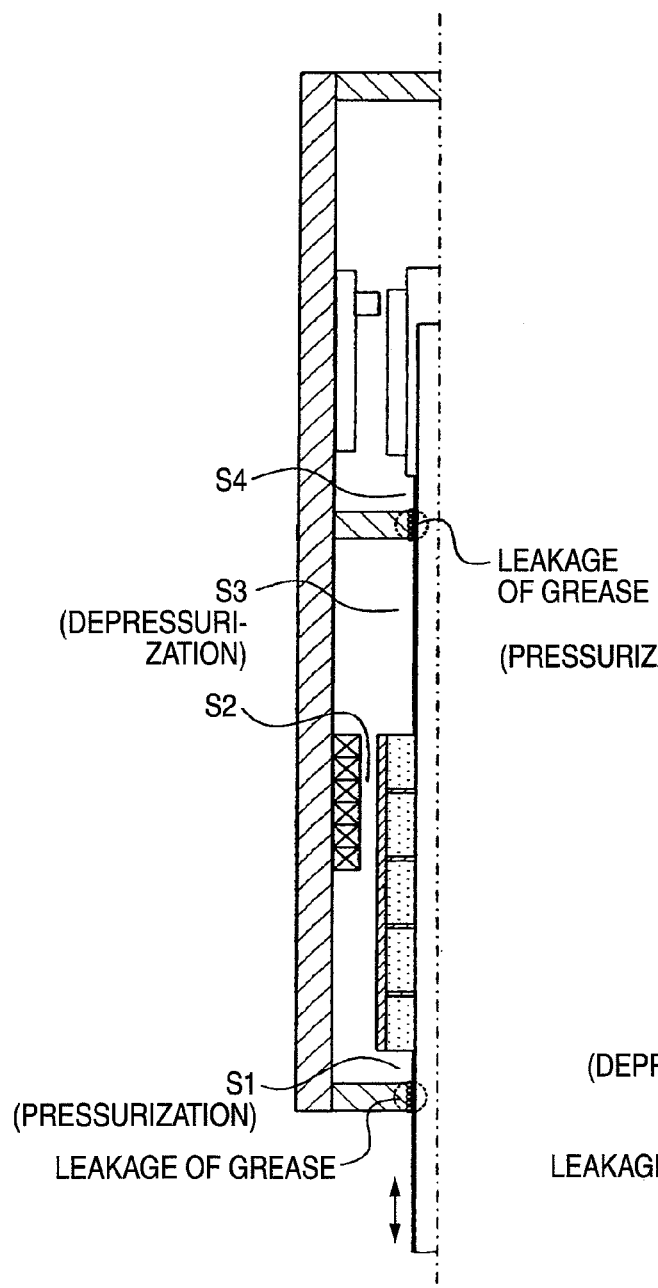
FIGS. 15A and 15B are schematic views illustrating flow of air at the time when the cylindrical linear motor shown in FIG. 14 moves within a stroke, where
Figure 15B:
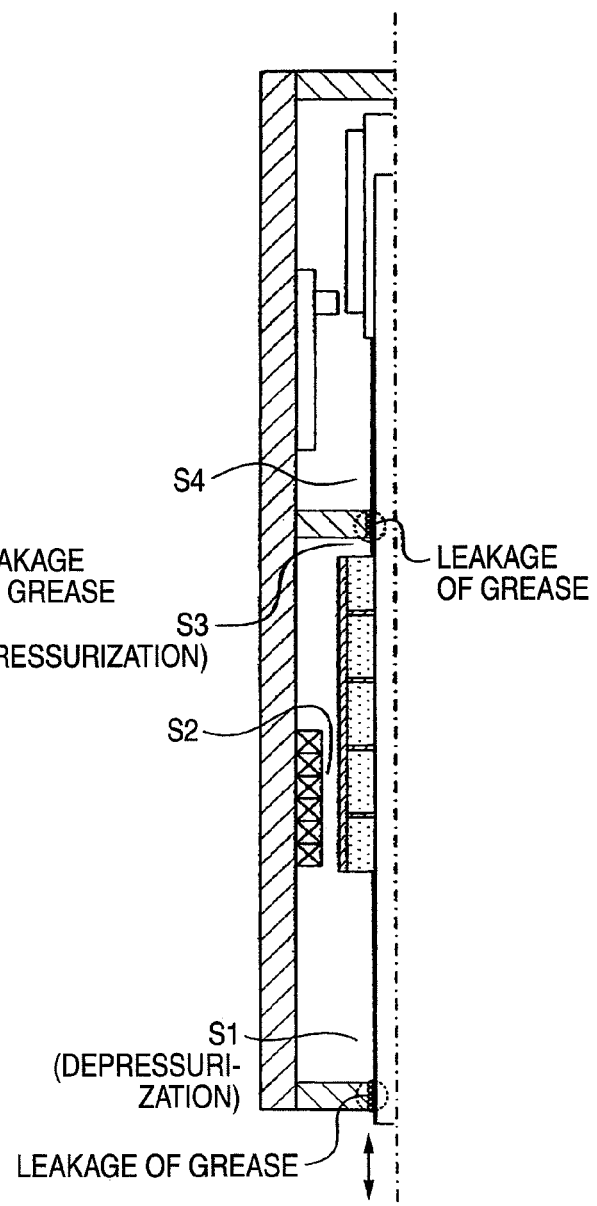

The description of the same constituent elements of the invention as the known art shown in FIG. 14 and the first embodiment shown in FIG. 1 is omitted, but differences thereof will be described.

In FIGS. 8 and 9, Reference Numerals 19 and 20 denote air holes, respectively.

The invention is characterized as follows.

Shafts support mechanisms 31 and 32 include spline shafts 81 and 82 connected to the mover 2, and ball spline nuts 71 and 72 serving as shaft support member for supporting the spline shafts 81 and 82 so that the mover 2 is movable in the axial direction at both axial ends of the metal pipe 4 of the stator 1. With such a configuration, a thrust force in the axial direction is generated between the electrical loading means of the stator 1 and the magnetic loading means of the stator 2, and the thrust force is drawn out through the stator 1 mounted on a device and the gap by the stator 2 supported to be movable in the axial direction.

Air holes 19 and 20 are formed in a diameter direction at the metal pipe 4 close to the ball spline nuts 71 and 72 serving as the shaft support members, and air flows in and out between the inside and the outside of the linear motor to keep air pressure in the linear motor constant.

In the present embodiment, since the air holes 19 and 20 is formed at the metal pipe 4 close to the ball spline nuts 71 and 72 as the shaft support members, air flow at the time when the linear motor moves within the stroke is as shown in FIGS. 9A and 9B. That is, when the mover moves downward as shown in FIG. 9A, air flows in from one air hole 20 and flows out from the other air hole 19 to keep air pressure in the motor regular. In addition, when the mover moves upward as shown in FIG. 9B, air flows in from one air hole 19 and flows out from the other air hole 20 to keep air pressure in the motor constant.

Assuming that a cross section of the air hole is represented by S [mm$^2$] and a volume in motor is represented by Q [mm$^3$], when air hole (S/Q=0.015) with appropriate size is formed as compared with a case of no air hole (S/Q=0) as shown in FIG. 10, it can be known that a thrust force necessary for movement is reduced by about ⅓. On the other hand, in an experiment, it was confirmed that the increase in thrust force caused by variation in pressure of air pressure in the motor is removed and thus durability of the support mechanism becomes about twice.

EIGHT EMBODIMENT

Figure 11:
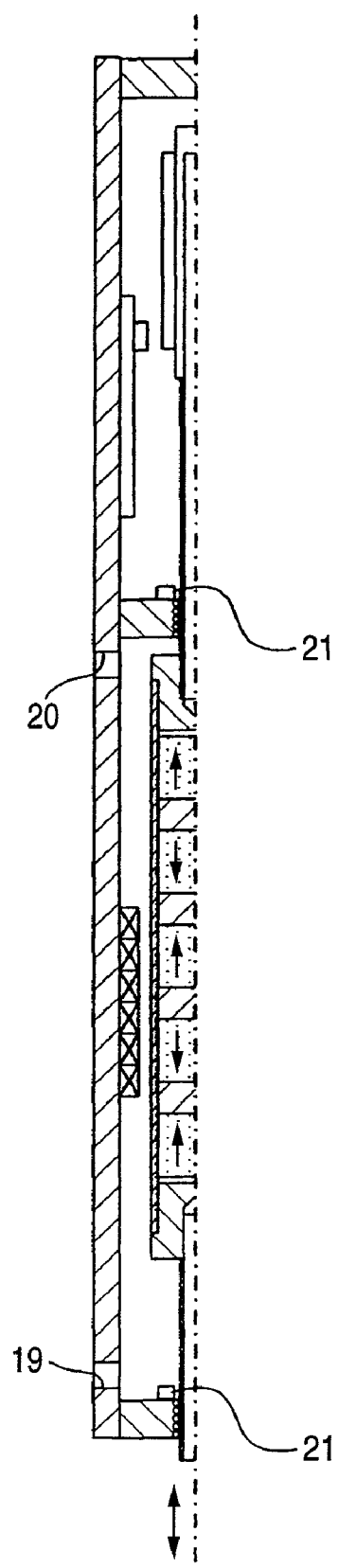
FIG. 11 is a side sectional view illustrating a cylindrical linear motor according to an eighth embodiment of the invention.
Figure 12:
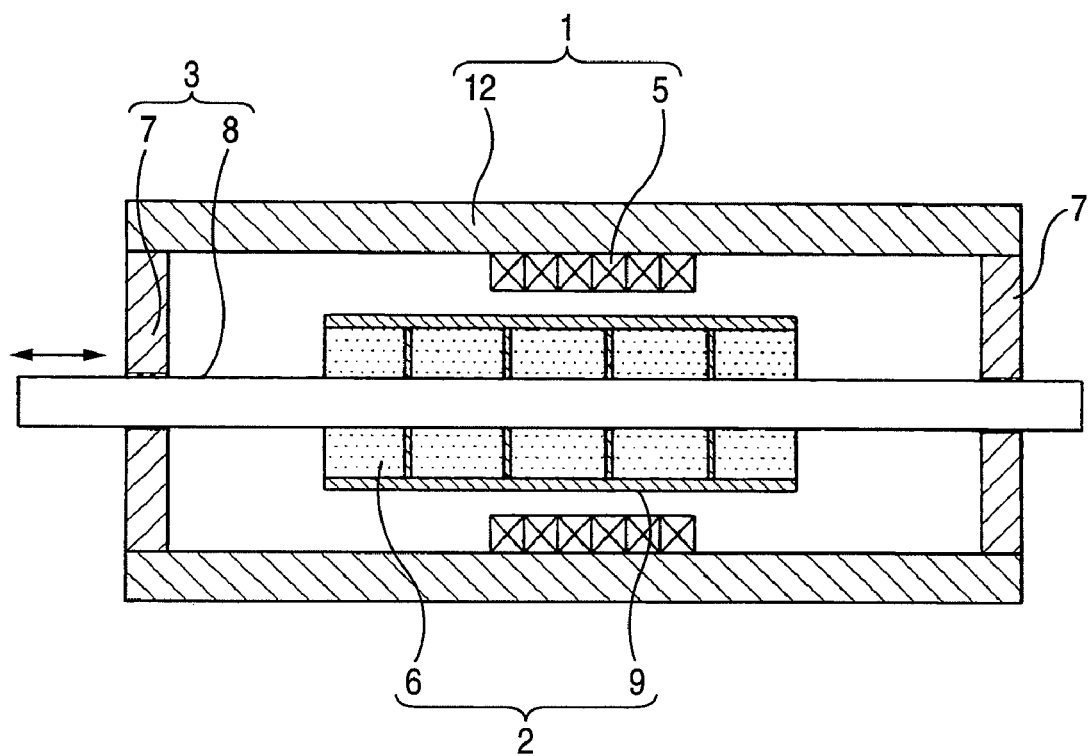
FIG. 12 is a side sectional view illustrating a configuration of a known cylindrical linear motor.
Figure 13:
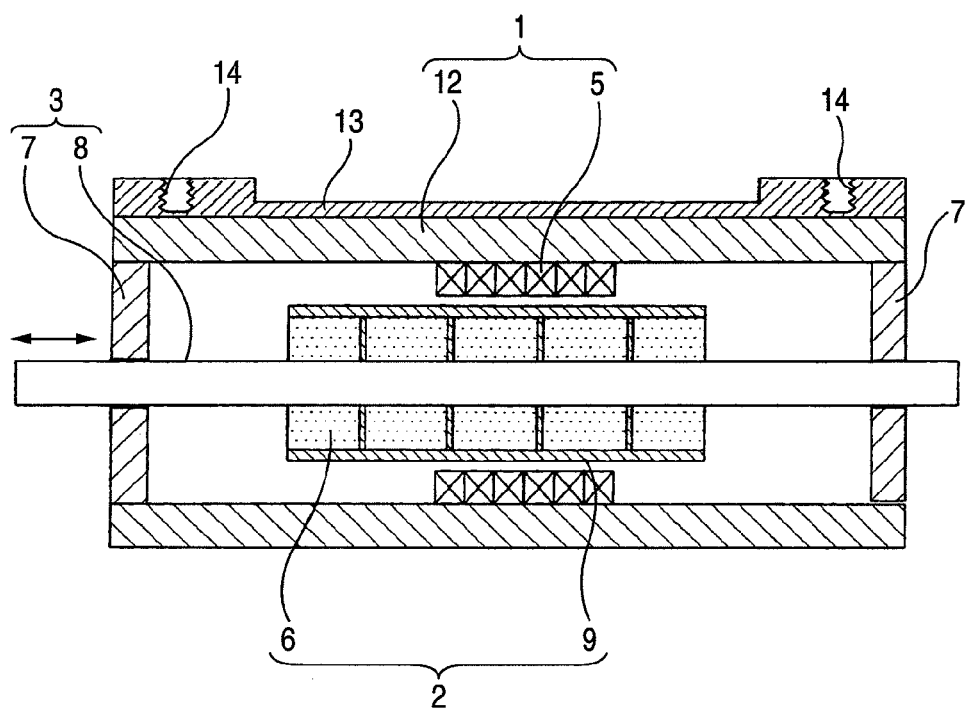
FIG. 13 is a side sectional view illustrating a fixing mechanism for fixing the cylindrical linear motor shown in FIG. 12 to an external device.

FIG. 11 is a side sectional view illustrating a cylindrical linear motor according to an eighth embodiment of the invention.

The configuration of the stator 1, the mover 2, and the detector 18 is the same as the seventh embodiment and thus the description thereof is omitted, but only differences will be described.

In FIG. 11, Reference Numeral 21 denotes a grease pool.

In the eighth embodiment, a difference from the seventh embodiment is that the mover of the cylindrical linear motor is vertically movable, and a grease pool 21 concentric with the shaft is formed on a vertical upper surface of the ball spline nut constituting the shaft support member.

When the mover of the cylindrical linear motor is vertically movable, the grease pool is formed on a vertical upper surface of the nut 71 to pool grease. Therefore, it is unnecessary to supply grease.

INDUSTRIAL APPLICABILITY

According to the cylindrical linear motor of the invention, it is possible to secure the space for disposing the permanent magnet in the mover and to obtain the frameless structure in which the attachment mechanism to a fixed surface of an external device is provided in the yoke constituting the stator. Therefore, for example, the cylindrical linear motor of the invention is applicable to liquid/semiconductor device manufacturing device or an inspection device, in which high-precise positioning and minute transport are required. Also, the cylindrical linear motor of the invention is applicable to a head of a tip mounter by arranging a plurality of cylindrical linear motors.

The invention claimed is:

1. A cylindrical linear motor comprising:
   a stator that has a plurality of coils coiled in a cylindrical shape and serving as electrical loading means, the plurality of coils being arranged in an axial direction on an inner side of a metal pipe made of a cylindrical magnetic material;
   a mover disposed to face an inner side of the stator with a magnetic gap there between and having a plurality of permanent magnets serving as magnetic loading means, the plurality of permanent magnets being inserted in the axial direction into a cylindrical thin can made of stainless steel extending in the axial direction;
   support mechanisms that include shafts inserted into the mover, and shaft support members for supporting the shafts such that the mover is movable in the axial direction at both axial ends of the metal pipe of the stator; and
   shaft receiving members each disposed at both ends of an inner side of the can to be adjacent to the permanent magnets, each of the shaft receiving members having concave portion, therein, wherein each of the shaft receiving members contacts the inner side of the can, and a cone of the shaft is always fixed to the concave portion.

2. The cylindrical linear motor of claim 1, wherein the shaft receiving member are made of a stainless steel, and the shaft receiving member are inserted into the can and then are fixed by welding.

3. The cylindrical linear motor of claim 2, wherein the welding is Tig welding.

4. The cylindrical linear motor of claim 2, wherein the welding is laser welding.

5. The cylindrical linear motor of claim 2, wherein the welding is electron beam welding.

6. The cylindrical linear motor of claim 1, wherein at least one of the support mechanisms provided at both axial ends uses a ball spline nut as the shaft support member, and uses a spline shaft as the shaft.

7. The cylindrical linear motor of claim 1, wherein
   the metal pipe includes:
   a convex portion provided on a part of a circumference of the metal pipe along the axial direction and molded to house a crossover wires of the coils; and
   through-holes formed at axial ends of the convex portion to attach the metal pipe to an external device by bolt screws.

8. The cylindrical linear motor of claim 7, wherein the convex portion of the metal pipe has a substantially U-shaped cross section as viewed in the axial direction,
   wherein a male screw and a bolt head of the bolt screw are formed of cylindrical members and disposed perpendicular to each other, and
   wherein the bolt head is disposed along the axial direction in the convex portion.

9. The cylindrical linear motor of claim 7 or 8, wherein the bolt screw is made of a nonmagnetic material.

10. The cylindrical linear motor of claim 7, wherein the through-holes have a slotted hole shape extending in the axial direction.

11. The cylindrical linear motor of claim 7 or 10, wherein the through-holes are a cutout hole formed by cutting out an end of the metal pipe.

12. The cylindrical linear motor of claim 1, wherein an air hole penetrating in a diameter direction is formed in at least one side of the metal pipe close to the shaft support member to keep air pressure constant in the linear motor.

13. The cylindrical linear motor of claim 1 or 12, wherein when the mover of the cylindrical linear motor is vertically movable, a grease pool concentric with the shaft is provided on a vertical upper surface of the ball spline nut of the shaft support member.

* * * * *